(12) United States Patent
He et al.

(10) Patent No.: US 8,968,550 B2
(45) Date of Patent: Mar. 3, 2015

(54) APPARATUS AND METHOD FOR CLEANING CHLOROBENZENES-CONTAMINATED SOIL AND GROUNDWATER

(71) Applicant: North China Electric Power University, Beijing (CN)

(72) Inventors: Li He, Beijing (CN); Jiaqi Zhang, Beijing (CN); Shichao Sun, Beijing (CN); Xiaomeng Li, Beijing (CN); Hongwei Lu, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 14/253,849

(22) Filed: Apr. 15, 2014

(65) Prior Publication Data

US 2014/0360888 A1     Dec. 11, 2014

(30) Foreign Application Priority Data

Jun. 7, 2013    (CN) .......................... 2013 1 0226524

(51) Int. Cl.
*B09C 1/08*     (2006.01)
*C02F 1/469*    (2006.01)

(52) U.S. Cl.
CPC ................ *B09C 1/085* (2013.01); *C02F 1/469* (2013.01)
USPC ....................................................... 205/743

(58) Field of Classification Search
CPC ...... B09C 1/085; C02F 1/469; C02F 1/46104; C02F 1/461
See application file for complete search history.

(56) References Cited

U.S. PATENT DOCUMENTS

| | | | |
|---|---|---|---|
| 6,086,739 A * | 7/2000 | Hodko | 204/515 |
| 2006/0163068 A1* | 7/2006 | Cundy et al. | 204/515 |
| 2007/0243022 A1* | 10/2007 | Pool | 405/128.1 |
| 2014/0339086 A1* | 11/2014 | He et al. | 204/516 |

OTHER PUBLICATIONS

First Office Action in CN Patent Application No. 201310226524.8, mailed Feb. 26, 2014.
Second Office Action in CN Patent Application No. 201310226524.8, mailed May 9, 2014.

* cited by examiner

*Primary Examiner* — Keith Hendricks
*Assistant Examiner* — Steven A. Friday
(74) *Attorney, Agent, or Firm* — Syncoda LLC; Feng Ma

(57) ABSTRACT

Apparatus and method for cleaning chlorobenzenes-contaminated soil and groundwater are provided related to environment protection. The apparatus includes a direct current power supply, permeable reactive barrier (PRB) reaction walls and electrodes, wherein the electrodes are arranged in a polluted area according the concentric circles, and are installed into electrode chambers; the PRB reaction walls are installed at ½ between the anode electrode and the cathode electrode and at ¼ from the anode electrode. Chlorobenzenes in the soil and groundwater can be gathered in the PRB reaction walls through the arrangement of the electrode area; and then the chlorobenzenes can be further removed by oxidation-reduction reactions in the PRB reaction walls.

3 Claims, 2 Drawing Sheets

APPARATUS AND METHOD FOR CLEANING CHLOROBENZENES-CONTAMINATED SOIL AND GROUNDWATER

CROSS-REFERENCE TO RELATED APPLICATIONS

The present application is a continuation of, and claims priority to, Chinese Patent Application No. 201310226524.8, filed Jun. 7, 2013, the disclosure of which is hereby incorporated by reference in its entirety.

BACKGROUND

With the rapid development of global industrialization, pollutants such as harmful heavy metals and organic substances go into the soil through various channels, causing soil pollution. Soil pollution not only affects agriculture, but also leads to groundwater pollution and also impacts human health negatively. Thus remediation for contaminated soil is a technique that highly needs development at present. Chlorobenzenes are physicochemically stable, uneasy to be hydrolyzed chemically and degraded biologically in soil, and are a kind of hydrophobic chlorinated organic pollutants widely existing in the environment. They can be irritating to human skin and mucosa, and can also be suppressive and narcotic to the central nerve system, causing human poisoning and endangering human health. In addition, chlorobenzenes often settle in soil for a long time, which causes serious pollution to soil and water. Therefore, research on degradation of chlorobenzenes and their residues in soil is of great importance. Although there are many kinds of remediation techniques, few of them are of universal adaptability.

A permeable reactive barrier (PRB) remediation technology is a kind of in-situ passive remediation technology. Its basic principle is to establish a permeable reaction zone along the flow direction or a direction perpendicular to the water flow direction, and the reaction zone is filled with active materials (such as zero-valent iron, activated carbon, and so on). When the water flow goes through the PRB under its own hydraulic gradient, there will be chemical reactions between the pollutants and the wall materials during which the pollutants are removed, so as to achieve the purpose of environmental remediation. Once installed, except in some cases where there is a need to replace the wall reaction materials, PRB will incur almost no other operating and maintenance expenses. Thus it is a technology that costs little and can be used for a long time. The main principle of an electrokinetic remediation technology is to apply a direct current (DC) voltage at the two ends of the contaminated soil to form an electric field gradient, then the pollutants in the soil will be migrated to the electrodes under the effects of electromigration, electroosmosis and electrophoresis in the electric field, so as to clean the soil and remove the pollution. The main targets of this technology include inorganic pollutants (such as lead, cadmium, chromium, zinc and other heavy metals), polar organic pollutants (such as phenol, chlorophenols, 4-chlorophenols, etc.) and non-polar organic pollutants (such as benzene, toluene, and xylene, etc.) and radioactive substances. The technology features the characteristics of high efficiency and cleanness. It can deal with pollutants at depth of up to 10 to 20 meters and has wide applicability.

Because of differences in the composition of soils, and in the types and properties of pollutants, especially in the case of multiple pollutions, it's difficult to reach the ultimate target with only a single remediation technology. In the electrokinetic remediation technology, due to a large amount of $H^+$ and $OH^-$ produced in cathode and anode in the electrochemical reaction process, in cases where there are no additional restrictions and measures, these ions will move to the cathode and anode by electromigration, electroosmosis and diffusion electrophoresis under the action of the electric field, until the two ions meet and neutralize, where they cause a change of the pH value, and where the entire operation zone can be divided into an acidic area and an alkaline area. Therefore, how to control the pH value has become the focus of the electrokinetic remediation technology. The PRB technology also has certain limitations. First, along with the continuous deposition of matters, such as organic substances, at the permeable reactive wall, the passive treatment will lose activity; therefore the equipment must be replaced regularly. Moreover, the present study on PRB is still insufficient, and there has been no best way to deal with multi components of multiple organic matters. The combined EK-PRB remediation technology is a new and environment-friendly remediation technology. This technology mainly combines the electrokinetic remediation technology and the PRB technology together in the remediation of contaminated soils, by which the organic substances with high toxicity are moved to the electrodes, where they react with the filling materials in the permeable reactive wall so that the pollutants can be degraded into low-valence metal ions, and organic matters with low toxicity. Thus this technology not only can remove pollutants but also can reduce their toxicity.

As an in-situ remediation technology that combines the advantages of the electrokinetic and PRB technologies, the combined EK-PRB technology can handle not only heavy metal pollutants, but also organic pollutants, such as chlorobenzenes. Additionally, the technology is also resistant to external interfering factors, capable of avoiding the addition of environment-unfriendly substances into the soil, and incurs much less remediation cost than other methods. Thus, an effective EK-PRB remediation technology is highly demanded to treat the groundwater and soils contaminated by organic pollutants such as chlorobenzenes.

SUMMARY

This invention relates to the technical field of environment protection, and in particular to an electrokinetic-permeable reactive barrier (EK-PRB) device and method of use thereof for remediation of chlorobenzenes-contaminated soil and groundwater. The invention discloses an electrokinetic-permeable reactive barrier device and method of use thereof for remediation of chlorobenzenes-contaminated soil and groundwater. The device and the method can be used for in-situ remediation of contaminated soil and groundwater. The absorbing materials in PRB can be adjusted based on different pollutants, and the diameter of the concentric circles can also be adjusted based on different ground conditions.

An EK-PRB device for remediation of chlorobenzenes-contaminated soil and groundwater, the structure of which is described as follows:

As shown in FIGS. 1 and 2, a DC power supply (1) is connected with a first electrode (4-1), a second electrode (4-2) and a third electrode (4-3) via wires, wherein the innermost first electrode (4-1) and the outermost third electrode (4-3) are anodes that are connected with anode of the DC power supply (1); the middle second electrode (4-2) is a cathode that is connected with the cathode of the DC power supply (1); the first electrode (4-1), the second electrode (4-2) and the third electrode (4-3) are respectively installed in electrode chambers (2-1), (2-2) and (2-3). An electrode solution storage tank (8) and an electrode solution treatment pond (9) are respectively connected with an automatic control device (7) via pipelines; the electrode solution storage tank (8) is connected with the electrode solution treatment pond (9) via pipelines and through a single-channel peristaltic pump (11); pH probes (5) are installed in each electrode chamber and connected with the automatic control device (7); the automatic control device (7) is connected with a multi-channel peristaltic pump (10) via a pipeline, which is further connected with the first electrode chamber (2-1), the second electrode chamber (2-2) and the third electrode chamber (2-3) respectively via pipelines. PRB reaction walls (3-1 and 3-2) are installed between the first electrode chamber (2-1) and the second electrode chamber (2-2), at ¼ and ½ of a distance from the first electrode chamber (2-1); and PRB reaction walls (3-3 and 3-4) are installed between the second electrode chamber (2-2) and the third electrode chamber (2-3), at ½ and ¼ of a distance from the third electrode chamber (2-3); the PH probes (5) and pH adjustment fluid inlet pipes (6-1, 6-2) are arranged between the PRB reaction walls (3-1, 3-2) and between the PRB reaction walls (3-3 and 3-4); the pH probes (5) are connected with the automatic control device (7), and the automatic control device (7) is connected with an acid solution storage tank (12) and an alkali solution storage tank (13) via pipelines; and the automatic control device (7) is connected with the pH adjustment fluid inlet pipes (6-1, 6-2) through the multi-channel peristaltic pump (10).

A method of using the above disclosed device to restore chlorobenzenes contaminated soil and groundwater, comprising the following steps:

1) investigating a polluted area determining a layout of the device, evaluating the scope and electric conductivity of the polluted area, and determining distances among the concentric rings to ensure that all the polluted area is covered;

2) arranging the first electrode chamber (2-1) and the first electrode (4-1) in an region with the most serious pollution, and arranging other electrode chambers and other electrodes concentrically;

3) arranging the two sets of PRB reaction walls between the two electrode areas at ½ between the anode and cathode and at ¼ away from the anode, so as to meet the requirement for simultaneous treatment of contaminated groundwater and soils;

4) preparing an electrode solution and adding the electrode solution in the electrode solution storage tank (8); adding the corresponding acid and alkaline solutions in the acid solution storage tank (12) and the alkali solution storage tank (13) respectively; and adding the electrode solution in the electrode chambers (2-1, 2-2, and 2-3); the electrode solution for the device is a mixed solution of sodium sulfate and sodium carbonate, with a $Na^+$ concentration of 0.025 mol/L; the acid solution is 5% HCl solution; and the alkali solution is 1% NaOH solution;

5) arranging the pH probes (5) in the polluted area; evenly arranging the pH adjustment fluid inlet pipes (6-1, 6-2) in the middle of the two sets of PRB reaction walls (3-1 and 3-2, 3-3 and 3-4) so as to adjust pH values in the PRB area to keep the pH value of the soil to be between 7-10, wherein when the pH value is too low, the pH value is neutralized by connecting the alkali solution storage tank (13) under control of the automatic control device (13); and conversely, if the pH value is too high, the acid solution storage tank (12) is connected;

6) testing the pH values of the electrode solutions in the electrode chambers (2-1, 2-2 and 2-3) by the pH probes (5), to check whether any of the electrode solutions is saturated in which the pH probes signal the automatic control device (7) to pump out and inject a saturated electrode solution into the electrode solution treatment pond (9); then new electrode solution is injected into the electrode chamber. After the electrode solutions recycled from the anode electrode and cathode electrode are mixed, the mixed solution can be treated to turn into a reusable electrode solution again and then can be transported to the electrode solution storage tank (8) via the single-channel peristaltic pump (11).

The above device and method can be used to remediate the chlorobenzenes-contaminated soil and groundwater. Through arrangement of an electrode area the chlorobenzenes in the contaminated soil and groundwater can be gathered in the PRB reaction walls; and can then be removed through an oxidation-reduction reaction in the PRB reaction walls.

Advantages of the invention may include:

1. The electrode solution can be automatically replenished through the measurement by the pH probes and the automatic control device; after being simply treated, the electrode solution in the cathode and anode chambers can be recycled and reused, reducing the operational cost.

2. The coupling of the pH probes with the automatic control device enhances the level of automation for the device, and further reduces the demand for staff and simplifies the operation.

3. A polluted area can be completely covered if the electrodes are arranged concentrically; the distance between concentric rings can be adjusted according to the local conditions so as to completely treat the contaminants within the polluted area.

4. By combining the electrokinetic the PRB technology, the device can simultaneously treat organic pollutants in soil and groundwater in situ, and can also accelerate the soil recovery rate.

DETAILED DESCRIPTION

The invention is further described with reference to the attached figures and specific embodiments.

Figure 1:
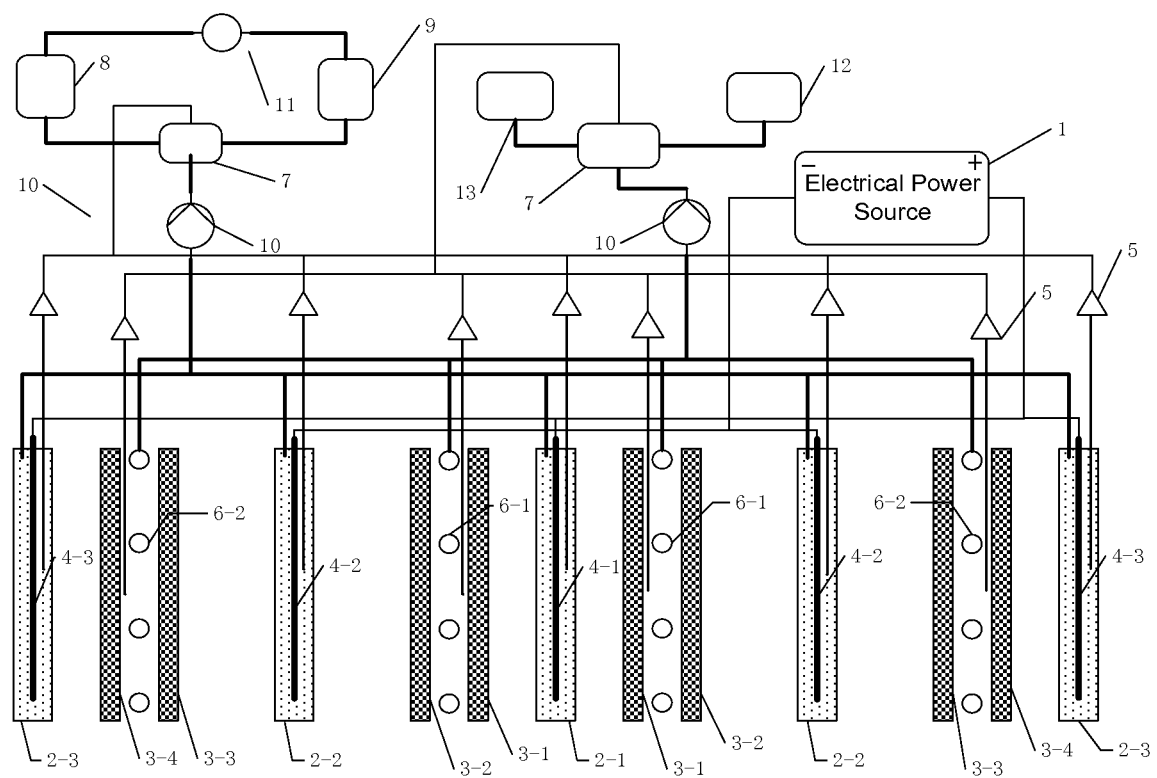
FIG. 1 is the schematic diagram of the disclosed device, in which (1) is direct current power supply, (2-1) and (2-3) are anode chambers, (2-2) is cathode chamber, (3-1), (3-2), (3-3) and (3-4) are PRB reaction walls, (4-1) and (4-3) are anode electrodes, (4-2) is cathode electrode, (5) are pH probes, (6-1) and (6-2) are pH adjustment fluid inlet pipes, (7) is automatic control device, (8) is electrode solution storage tank, (9) is electrode solution treatment pond, (10) is multi-channel peristaltic pump, (11) is single-channel peristaltic pump, (12) is acid solution storage tank, and (13) is alkali solution storage tank.
Figure 2:
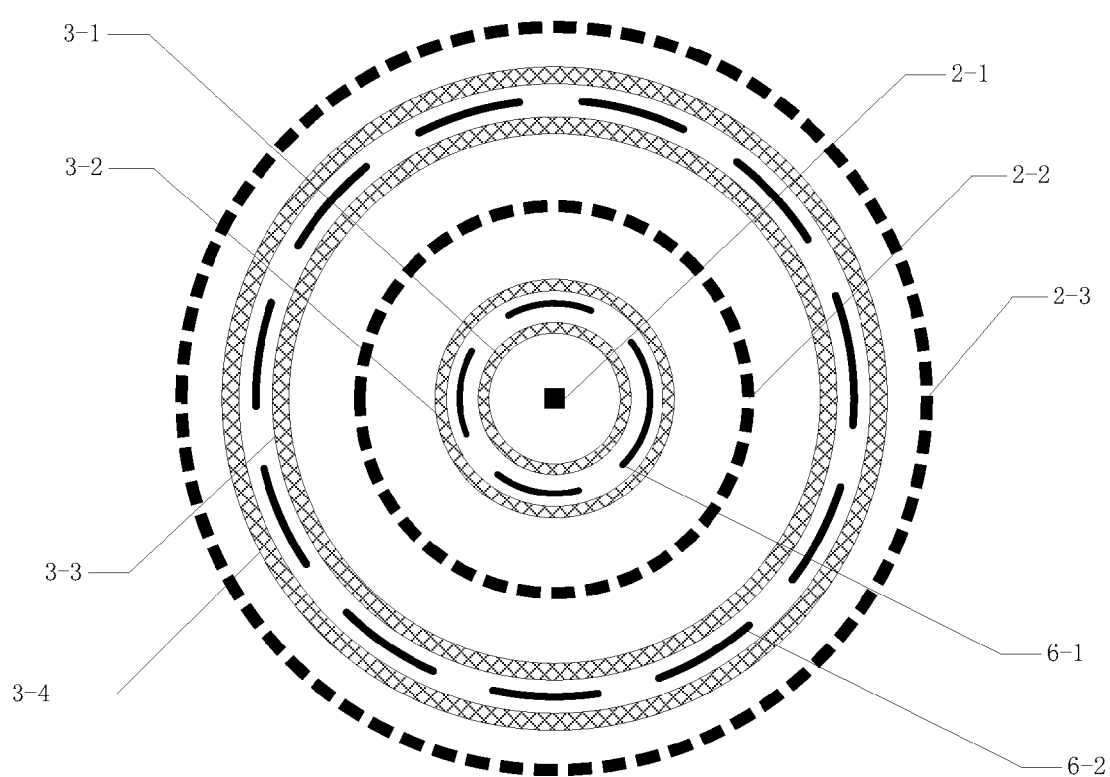
FIG. 2 is the schematic layout of the device, in which (2-1) and (2-3) are anode chambers, (2-2) is cathode chamber, (3-1), (3-2), (3-3) and (3-4) are PRB reaction walls, and (6-1) and (6-2) are pH adjustment fluid inlet pipes.

A remediation device for chlorobenzenes-contaminated soil and groundwater is as shown in FIG. 1, the remediation device comprises a DC power supply (1), an anode electrode (4-1), a cathode electrode (4-2), a anode electrode (4-3), two anode chambers (2-1, 2-3), a cathode chamber (2-2), an electrode solution storage tank (8), an electrode solution treatment pond (9), an automatic control device (7), a single-channel peristaltic pump (11), pH probes (5), a multi-channel peristaltic pump (10), a first PRB reaction wall (3-1), a second PRB reaction wall (3-2), a third PRB reaction wall (3-3), a fourth PRB reaction wall (3-4), a first pH adjustment fluid inlet pipe (6-1), a second pH adjustment fluid inlet pipe (6-2), an acid solution storage tank (12) and an alkali solution storage tank (13).

The DC power supply (1) is connected with electrodes (4-1, 4-2 and 4-3) via wires, wherein the first electrode (4-1) at the circle center and the outermost electrode (4-3) are anodes that are connected with the positive terminal of the DC power supply (1); the second electrode (4-2) is a cathode that is connected with the negative terminal of the DC power supply (1); the first electrode (4-1), the second electrode (4-2) and the third electrode (4-3) are respectively arranged in the electrode chambers (2-1), (2-2) and (2-3). The electrode solution storage tank (8) and the electrode solution treatment pond (9) are respectively connected with the automatic control device (7) via pipelines; the electrode solution storage tank (8) is connected with the electrode solution treatment pond (9) via pipelines and through the single-channel peristaltic pump (11); the pH probes (5) are installed in each electrode chamber and are connected with the automatic control device (7); the automatic control device (7) is connected with the multi-channel peristaltic pump (10) with via a pipeline, which is further connected with the first electrode chamber (2-1), the second electrode chamber (2-2) and the third electrode chamber (2-3) respectively via pipelines. PRB reaction walls (3-1 and 3-2) are installed between the first electrode chamber (2-1) and the second electrode chamber (2-2), at ¼ and ½ of the distance from the first electrode chamber (2-1); and PRB reaction walls (3-3 and 3-4) are installed between the second electrode chamber (2-2) and the third electrode chamber (2-3), at ½ and ¼ of the distance from the third electrode chamber (2-3). The pH probes (5) and the pH adjustment fluid inlet pipes (6-1, 6-2) are arranged between the PRB reaction walls (3-1, 3-2) and between the PRB reaction walls (3-3 and 3-4); the pH probes (5) are connected with the automatic control device (7); and the automatic control device (7) is connected with the acid solution storage tank (12) and the alkali solution storage tank (13) by pipelines, and the automatic control device (7) is connected with the pH adjustment fluid inlet pipes (6-1, 6-2) through the multi-channel peristaltic pump (10).

A method for restoring chlorobenzenes-contaminated soil and groundwater using the above remediation device, comprising the following steps:

1) investigating the polluted area, determining the layout of the device, evaluating the scope and electric conductivity of the polluted area, and determining the distance among the concentric rings based on the overall consideration to ensure that all the polluted area is covered;

2) arranging the first electrode chamber (2-1) and the anode electrode (4-1) in a region with the most serious pollution, and arranging the other electrode chambers and the other electrodes concentrically;

3) arranging the two sets of PRB reaction walls (3-1 and 3-2, 3-3 and 3-4) between the two electrode areas at ½ between the anode electrode and the cathode electrode and at ¼ from the anode electrode, so as to meet the requirement for simultaneous treatment of contaminated groundwater and soils;

4) preparing the electrode solution and adding the electrode solution in the electrode solution storage tank (8); adding the corresponding acid and alkaline solutions in the acid solution storage tank (12) and the alkali solution storage tank (13) respectively; and adding the prepared electrode solution in the electrode chambers (2-1, 2-2, and 2-3); the electrode solution for the device is a mixed solution of sodium sulfate and sodium carbonate , with a $Na^+$ concentration of 0.025 mol/L; the acid solution is 5% HCl solution; and the alkali solution is 1% NaOH solution;

5) arranging the pH probes (5) in the polluted area; evenly arranging the pH adjustment fluid inlet pipes(6-1, 6-2) in the middle of the two sets of PRB reaction walls (3-1 and 3-2, 3-3 and 3-4) so as to adjust the pH values in the PRB area to keep the pH values of the electrode soil between 7-10, wherein when the pH value is too low, the pH value can be neutralized by connecting the alkali solution storage tank (13)under control of the automatic control device (13); and conversely, if the pH value is too high, the acid solution storage tank (12) is connected;

6) Testing the pH value of the electrode solution by the pH probes (5) in the electrode chambers (2-1, 2-2 and 2-3), to check whether the electrode solution is saturated, in which the pH probes signal the automatic control device (7) to pump out and injects the saturated electrode solution into the electrode solution treatment pond (9); then new electrode solution is injected into the electrode chamber. After the electrode solutions recycled from the anode electrode and the cathode electrode are mixed, the mixed solution can be treated to turn into reusable electrode solution again and then can be transported to the electrode solution storage tank (8) via the single-channel peristaltic pump (11).

If a polluted area is big, the number of the electrode chamber can be increased, but it must be ensured that the innermost and the outermost electrodes are the anodes.

Embodiments

Step 1: Assembly of an Electrokinetic Apparatus

Based on current research, an electrokinetic apparatus was assembled, which include a DC power supply, electrode chambers and electrodes.

Step 2: Preparation of a Soil Sample:

A topsoil sample around 0-20 cm deep from the ground surface was taken; after being dried, the sample was filtered by a 0.25 mm copper mesh screen to remove grits and plant residues; the soil sample containing 1000 mg/kg of chlorobenzenes was prepared.

Step 3: Preparation of Solutions

A mixed solution of sodium sulfate and sodium carbonate containing 0.025 mol/L of $Na^+$ was prepared as the electrode solution; and the pH adjustment fluids are 5% of HCl solution and 1% of NaOH of solution.

Step 4: Composition and Size of PRB Reaction Walls

A mixture of activated carbon and scrap iron with a mass ratio of 2:7 was used as the absorbing materials in the PRB reaction walls; the size of the PRB reaction wall was 5 cm×80 cm (W×H).

Step 5: Assembly of the Whole Device

The prepared soil sample was filled in an organic glass cylinder 2 m in diameter and 1 m deep; the soil sample was tamped per filling of soil 5 cm deep. The two sides of the organic glass cylinder were provided with water sinks; groundwater flow was simulated through a peristaltic pump; the inlet and outlet water levels were maintained at 50 cm and 49 cm, respectively. An anode electrode was arranged at the circle center, and a round of anode electrode was arranged at the periphery. The PRB reaction walls were arranged at circles 0.25 m, 0.5 m, 1.5 m and 1.75 m from the central point.

Step 6: Operation of the Device.

An electric field was applied by connecting the 100V DC, which had an electric field intensity of 1 V/cm. The electrode chambers and the electrode solution storage tank were filled with electrode solution. The electrode solution storage tank was controlled by the automatic control device and the single-channel peristaltic pump, whose electrode solution could be replenished from a new electrode solution recycled from the electrode solution reaction pond, making the electrode solution reusable. The pH adjustment fluid inlet pipes were connected with the acid solution storage tank and the alkali solution storage tank. The pH adjustment fluid inlet pipes (6-1, 6-2) were arranged between the adjacent PRB reaction walls. The pH probes arranged between the electrode region and the PRB reaction walls was used for collecting parameters on pH values, which were controlled by the automatic control device and the multi-channel peristaltic pump so as to achieve automatic control of the system. After 10 hours of treatment by the EK-PRB device, the removal rate of chlorobenzenes reached 84.3%; and the removal rate further reached 99% after 5 more hours of treatment.

In this invention, the chlorobenzenes in the soil and groundwater can be gathered in the PRB area through the arrangement of the electrode area; and then chlorobenzenes can be further removed through oxidation-reduction reactions in the of PRB reaction walls. This invention can automatically replenish and recycle the electrode solution, which reduces the cost, enhances the level of automation for the device, and further reduces the demand for staff and simplifies the operation; and by thoroughly processing the contaminants in the polluted area, the soil restoration speed can be accelerated.

This invention can greatly improve the efficiency for treatment of chlorobenzenes in soil and groundwater; the electrode solution can be recycled by installing the electrode solution treating pond, having an increased economic benefit. The use of pH probes and the automatic control device, can further increase the automation level of the treatment process.

The invention claimed is:

1. An apparatus for remediation of chlorobenzenes-contaminated soil and groundwater, the apparatus comprising: a DC power supply (1), a first electrode (4-1), a second electrode (4-2), a third electrode (4-3), a first electrode chamber (2-1), a second electrode chamber (2-2), a third chamber (2-3), pH probes (5), an automatic control device (7), an electrode solution storage tank (8), an electrode solution treatment pond (9), a multi-channel peristaltic pump (10), a single-channel peristaltic pump (11), a first PRB reaction wall (3-1), a second PRB reaction wall (3-2), a third PRB reaction wall (3-3), a fourth PRB reaction wall (3-4), a first pH adjustment fluid inlet pipe (6-1), a second pH adjustment fluid inlet pipe (6-2), an acid solution storage tank (12) and an alkali solution storage tank (13);

wherein: the DC power supply (1) is connected with the first electrode (4-1), the second electrode (4-2) and the third electrode (4-3) via wires; the first electrode (4-1) at a circle center and the outermost third electrode (4-3) are anodes that are connected with a positive terminal of the DC power supply (1); the second electrode (4-2) is a cathode that is connected with a negative terminal of the DC power supply (1); the first electrode (4-1), the second electrode (4-2) and the third electrode (4-3) are respectively arranged in the first electrode chamber (2-1), the second electrode chamber (2-2) and the third electrode chamber (2-3); the electrode solution storage tank (8) and the electrode solution treatment pond (9) are respectively connected with the automatic control device (7) via pipelines; the electrode solution storage tank (8) is connected with the electrode solution treatment pond (9) via pipelines and through the single-channel peristaltic pump (11); each of the electrode chambers are provided with one said pH probe (5), and each pH probe (5) is connected with the automatic control device (7); the automatic control device (7) is connected with the multi-channel peristaltic pump (10) via a pipeline, and the multi-channel peristaltic pump (10) is further connected with the first electrode chamber (2-1), the second electrode chamber (2-2) and the third electrode chamber (2-3) respectively via pipelines; the first PRB reaction wall (3-1) and the second PRB reaction wall (3-2) are arranged between the first electrode chamber (2-1) and the second electrode chamber (2-2), at distances of ¼ and ½ of a total distance between the first electrode chamber (2-1) and the second electrode chamber (2-2) from the first electrode chamber (2-1) respectively; the third PRB reaction wall (3-3) and the fourth PRB reaction wall (3-4) are arranged between the second electrode chamber (2-2) and the third electrode chamber (2-3), at distances of ½ and ¼ of a total distance between the second electrode chamber (2-2) and the third electrode chamber (2-3) from the third electrode chamber (2-3) respectively; the PH probes (5), the first pH adjustment fluid inlet pipes (6-1) and the second pH adjustment fluid inlet pipes (6-2) are arranged between the first PRB reaction wall (3-1) and the second PRB reaction wall (3-2) and between the third PRB reaction wall (3-3) and the fourth PRB reaction wall (3-4); the pH probes (5) are connected with the automatic control device (7), and the automatic control device (7) is connected with the acid solution storage tank (12) and an alkali solution storage tank (13) via pipelines; and the automatic control device (7) is connected with the first pH adjustment fluid inlet pipes (6-1) and the second pH adjustment fluid inlet pipes (6-2) through the multi-channel peristaltic pump (10).

2. A method for restoring chlorobenzenes-contaminated soil and groundwater, the method comprising:
 1) investigating a polluted area, determining layout of the device a remediation apparatus, evaluating scope and electric conductivity of the polluted area, and determining distances among concentric rings of the remediation apparatus to ensure that all the polluted area is covered;
 2) arranging a first electrode chamber (2-1) and a first electrode (4-1) in a region with the most serious pollution, and arranging other electrode chambers and other electrodes concentrically;
 3) arranging two sets of PRB reaction walls (3-1 and 3-2, 3-3 and 3-4) between two electrode areas at ½between an anode electrode and a cathode electrode and at ¼from the anode electrode, so as to meet a requirement for simultaneous treatment of contaminated groundwater and soil;
 4) preparing an electrode solution and adding the electrode solution in an electrode solution storage tank (8), adding a corresponding acid solution and an alkali solution in an acid solution storage tank (12) and an alkali solution storage tank (13), respectively, adding the electrode solution in first, second and third electrode chambers (2-1, 2-2, and 2-3), wherein the electrode solution is a mixed solution of sodium sulfate and sodium carbonate, with a $Na^+$ concentration of 0.025 mol/L, the acid solution is 5% HCl solution, and the alkali solution is 1% NaOH solution;
 5) arranging pH probes (5) in the polluted area; evenly arranging pH adjustment fluid inlet pipes (6-1, 6-2) in the middle of the two sets of PRB reaction walls (3-1 and 3-2, 3-3 and 3-4) so as to adjust pH values of soils in the PRB reaction walls to keep the pH values of the soil to be between 7-10, wherein when the pH value is too low, the soils can be neutralized by connecting the alkali solution storage tank (13) under control of an automatic control device (7), and conversely, if the pH value is too high, the acid solution storage tank (12) is connected;

6) testing pH values of the electrode solution by pH probes (5) in the first, second and third electrode chambers (2-1, 2-2 and 2-3) to check whether the electrode solution is saturated, in which the pH probes signal an additional automatic control device (7) to pump out and inject the saturated electrode solution into an electrode solution treatment pond (9); then new electrode solution is injected into the electrode chambers; after electrode solutions recycled from the anode electrode and the cathode electrode are mixed, the mixed solution can be treated to turn into reusable electrode solution again and then can be transported to the electrode solution storage tank (8) via a single-channel peristaltic pump (11).

3. The method according to claim 2, further comprising increasing number of electrode chambers, while maintaining that the innermost and outermost electrodes are anodes.

* * * * *